(12) United States Patent
Wett et al.

(10) Patent No.: US 9,346,694 B2
(45) Date of Patent: May 24, 2016

(54) METHOD AND APPARATUS FOR NITROGEN REMOVAL IN WASTEWATER TREATMENT

(71) Applicants: D.C. Water & Sewer Authority, Washington, DC (US); Hampton Roads Sanitation District, Virginia Beach, VA (US)

(72) Inventors: Bernhard Wett, Innsbruck (AT); Ahmed Omari, Washington, DC (US); Pusker Regmi, Virginia Beach, VA (US); Mark Miller, Virginia Beach, VA (US); Charles B. Bott, Virginia Beach, VA (US); Sudhir N. Murthy, Washington, DC (US)

(73) Assignees: D.C. Water & Sewer Authority, Washington, DC (US); Hampton Roads Sanitation District, Virginia Beach, VA (US)

( * ) Notice: Subject to any disclaimer, the term of this patent is extended or adjusted under 35 U.S.C. 154(b) by 181 days.

(21) Appl. No.: 14/026,569

(22) Filed: Sep. 13, 2013

(65) Prior Publication Data
US 2014/0069864 A1    Mar. 13, 2014

Related U.S. Application Data

(60) Provisional application No. 61/700,717, filed on Sep. 13, 2012, provisional application No. 61/708,498, filed on Oct. 1, 2012, provisional application No. 61/783,232, filed on Mar. 14, 2013.

(51) Int. Cl.
*C02F 3/30* (2006.01)
*C02F 3/00* (2006.01)
*C02F 3/34* (2006.01)

(52) U.S. Cl.
CPC ............... *C02F 3/303* (2013.01); *C02F 3/006* (2013.01); *C02F 3/305* (2013.01); *C02F 3/307* (2013.01);
(Continued)

(58) Field of Classification Search
CPC .......... C02F 3/303; C02F 3/305; C02F 3/307; C02F 3/006; C02F 3/348; C02F 2209/14; C02F 2209/15; C02F 2209/22; Y02W 10/15

USPC .......... 210/605, 614, 620, 626, 630, 143, 151
See application file for complete search history.

(56) References Cited

U.S. PATENT DOCUMENTS 6,485,646 B1    11/2002    Dijkman et al.
6,592,762 B2    7/2003    Smith
(Continued)

FOREIGN PATENT DOCUMENTS

WO    WO 98/30504 A1    7/1998
WO    WO 2012/112679 A2    8/2012

OTHER PUBLICATIONS

Bernet, Nicolas, et al., "Nitrification at Low Oxygen Concentration in Biofilm Reactor", Journal of environmental engineering , vol. 127, No. 3, Mar. 2001 pp. 266-271.
(Continued)

*Primary Examiner* — Fred Prince
(74) *Attorney, Agent, or Firm* — Blank Rome LLP

(57) ABSTRACT

One or more reactor and one or more control methods are used for nitrogen removal in wastewater treatment to achieve measured control of maintaining high ammonia oxidizing bacteria (AOB) oxidation rates while achieving nitrite oxidizing bacteria (NOB) out-selection, using various control strategies, including: 1) ammonia and the use of ammonia setpoints; 2) operational DO and the use of DO setpoints; 3) bioaugmentation of anammox and lighter flocculant AOB fraction; and 4) implementation of transient anoxia in several reactor configurations and conditions for removal of oxidized nitrogen using anammox or heterotrophic organisms. Controls described maximize nitrogen removal with minimal aeration, through control of transient anoxia and aerobic SRT, out-selection of NOB, and control of DO concentrations or aeration interval by keeping the reactor ammonia ($NH_4$) and oxidized nitrogen (NOx) concentrations approximately equal, and maximize total inorganic nitrogen (TIN) removal through nitrification, limited nitritation, nitritation, denitrification, denitritation or deammonification making use of the aforementioned strategies.

20 Claims, 11 Drawing Sheets

(52) U.S. Cl.
CPC ............. *C02F 3/348* (2013.01); *C02F 2209/14* (2013.01); *C02F 2209/15* (2013.01); *C02F 2209/22* (2013.01); *Y02W 10/15* (2015.05)

(56) References Cited

U.S. PATENT DOCUMENTS

| | | |
|---|---|---|
| 7,404,897 B2 | 7/2008 | Bailey, Jr. et al. |
| 7,846,334 B2 | 12/2010 | Wett |
| 7,862,722 B2 | 1/2011 | Moon |
| 2008/0314841 A1* | 12/2008 | Moon ........................ 210/746 |
| 2010/0193431 A1 | 8/2010 | Ikuta et al. |
| 2011/0180476 A1 | 7/2011 | Vanotti et al. |
| 2011/0284461 A1 | 11/2011 | DiMassimo et al. |
| 2012/0006414 A1* | 1/2012 | Hazard ................... C02F 3/006 137/4 |

OTHER PUBLICATIONS

Intellectual Property Office of Singapore Written Opinion of Application No. 11201501891T, dated Dec. 16, 2015.

\* cited by examiner

METHOD AND APPARATUS FOR NITROGEN REMOVAL IN WASTEWATER TREATMENT

This application claims the benefit of U.S. Provisional Application No. 61/700,717, filed Sep. 13, 2012, U.S. Provisional Application No. 61/708,498, filed Oct. 1, 2012, and U.S. Provisional Application 61/783,232, filed Mar. 14, 2013. The entire disclosures of U.S. Provisional Applications Nos. 61/700,717, 61/708,498 and 61/783,232 are incorporated herein by reference.

The present disclosure generally relates to wastewater treatment systems and methods. Usually nitrogen removal is the treatment task that requires the most resources in terms of reactor volume, aeration energy and chemical dosage. The present disclosure targets more resource-efficient metabolic pathways in nitrogen removal—so called short-cut biological nitrogen removal. Aspects of the present disclosure enable nitrogen removal from wastewater to produce high-quality effluent at reduced energy, chemicals and cost.

The suppression of nitrite oxidizing bacteria (NOB) is a precondition for the implementation of short-cut biological nitrogen removal (ScBNR) processes such as nitritation-denitritation (see Ciudad et al., 2005; Gee and Kim, 2004, Ju et al., 2007, Yoo et al., 1999, Yu et al., 2000, Zeng et al., 2008), nitrite-shunt and partial nitritation-anaerobic ammonia oxidation (anammox) (see Fux et al., 2002, Hippen et al., 1997, van Dongen et al., 2001, Wett, 2006, Wett, 2007, Wett et al., 2010), and deammonification. Successful suppression of nitrite oxidation by controlling NOB saves 25% oxygen and 40% organic carbon compared to conventional nitrification-denitrification (see Turk and Mavinic, 1986; Abeling and Seyfried, 1992). In deammonification processes, the control of NOB results in added benefits in further reductions in aeration energy required, and reduced costs of electron donor and solids handling. FIG. 1, FIG. 2 and FIG. 3 show flowcharts for nitrogen removal through conventional nitrification/denitrification, nitritation/denitritation and deammonification (partial nitritation+anaerobic ammonia oxidation), respectively.

Simultaneous nitrification and denitrification (SND) in a single tank is highly desirable compared to the conventional systems, since separate tanks and recycling of mixed liquor nitrate from the aerobic nitrifying zone to the anoxic denitrifying zone is not required. The benefits of SND are further extended by exploiting the nitrite shunt pathway as has been demonstrated by the use of aeration duration control with oxidation reduction potential (ORP) (see Guo et al. 2009) and ammonia pH profile (see Peng et al. 2004). The reactor microenvironments (aerobic and anoxic zones developing within a reactor due to combination of poor mixing and reactor design) and the floc microenvironments (aerobic and anoxic zones developing within the activated sludge flocs) have been postulated as possible mechanisms for SND (see Daigger et al. 2007). It is difficult to incorporate control strategies in the above-mentioned mechanisms to achieve stable SND performance. The occurrence of SND are reported in staged, closed loop reactors (such as oxidation ditch, Orbal) (see Daigger and Littenton, 2000) that typically employ long hydraulic residence time (HRT), solids retention time (SRT), and continuous low dissolved oxygen (DO).

In view of the high cost of biological nutrient removal (BNR) to meet increasingly stringent effluent standards, ScBNR through suppression of NOB is a topic of interest. Efforts to understand NOB suppression have been discussed in many publications, including those that are more specific to the use of high temperature (see Hellinga et al., 1998, the disclosure of which is expressly incorporated by reference herein in its entirety), high levels of free ammonia inhibition, or DO concentration (see Blackburne et al., 2008) and transient anoxia (see Kornaros and Dokianakis, 2010). Particularly, all of these conditions are used in part or as a whole, in various approaches, with success in controlling NOB in systems treating high-ammonia-strength waste streams, such as anaerobic digester dewatering liquor (also usually at high temperature) and landfill leachate. High-ammonia-strength waste streams are defined here as having an influent feed with an ammonia concentration of greater than 200 mg/L as nitrogen. Control of NOB suppression in low-strength waste streams such as domestic wastewater remains a challenge and is the subject of the present disclosure. Controls that are currently used to suppress NOB in ScBNR processes are described below.

Temperature and Ammonia: Both temperature and free ammonia are features believed to provide an advantage to ammonia oxidizing bacteria (AOB) over NOB. Free ammonia (FA) inhibition of NOB has been well-documented in literature ever since it was considered by Anthonisen et al. (1976), the disclosure of which is expressly incorporated by reference herein in its entirety. However, knowledge of controlling FA inhibition to obtain stable nitritation is more limited since NOB adaptation has been reported (see Turk and Mavinic, 1989; and Wong-Chong and Loehr, 1978). Further, high temperature is known to favor growth of AOB over NOB (see Kim et al., 2008).

The increased activity of AOB compared to NOB at higher temperature, greater dissociation of total ammonia to free ammonia and resulting NOB inhibition at higher temperatures, combined with low DO operation (often conducted using intermittent aeration and with managed aerobic solids retention time (SRT)), results in enrichment of AOB and selective wash out of NOB. These approaches are variously described (see EP 0826639 A1, EP 0872451 B1, US 2010/0233777 A1, U.S. Pat. No. 7,846,334 B2, U.S. Pat. No. 6,485, 646 B1, and WO 2012/052443 A1) to control NOB in high ammonia strength wastewater. The methods either use suspended growth (see WO 2006/129132 A1), attached growth on the support media (see US 2011/0253625 A1 and EP 0931768 B1) or granular sludge (see Wett, 2007; and U.S. Pat. No. 7,846,334 B2) to accomplish ScBNR.

In spite of being effective, the role of elevated temperature to increase activity of AOB and for the control of NOB growth is not feasible in low-strength mainstream processes operating under a wide range of temperatures. Consequently, NOB control in low-strength wastewater remains intractable and requires careful manipulation of factors other than temperature or free ammonia.

Dissolved oxygen (DO): DO can play a significant role in control of NOB in low-ammonia-strength wastewater. Sustained nitritation with the use of low DO concentration has been observed in a variety of reactor configurations (see Sliekers et al., 2005, Wyffels et al., 2004, and Blackburne et al., 2008). Although these reports lack an account of underlying mechanisms, they resort to a hypothesis of higher oxygen affinity of AOB compared to NOB (see Hanaki et al., 1990; Laanbroek and Gerards, 1993; and Bernet et al., 2001) as an explanation for the observed phenomenon (see Yoo et al., 1999, Peng et al., 2007, Lemaire et al., 2008, Gao et al., 2009, and Zeng et al., 2009). Sin et al. (2008) documented the prevalence of the belief that AOB oxygen affinity is greater than NOB oxygen affinity and that low DO operation favors AOB over NOB, however, there are studies that report the opposite (see Daebel et al., 2007, and Manser et al., 2005), and the present inventors have data (see FIGS. 5-6) that indicate stronger adaptation to low DO-concentration for NOB compared to AOB.

Bioaugmentation and biomass enrichment: The transfer of nitrifying biomass from a high strength reactor to the low strength mainstream reactor, such that the SRT required to perform nitrification is decreased in the mainstream process has been reported (U.S. Pat. No. 7,404,897 B2, U.S. Pat. No. 6,602,417 B1). This bioaugmentation can occur from a separate sidestream reactor or a reactor co-joined with the mainstream reactor (Parker and Wanner, 2007). There is also prior art related to the physical separation of a more dense biomass fraction containing predominantly anammox organisms and recycling this heavier fraction by the use of the hydrocyclone in order to enrich the very slowly growing biomass (EP 2163524A1, US 2011/0198284 A1).

Transient Anoxia: The use of transient anoxia has been a common approach to achieve NOB suppression (see Li et al., 2012; Ling, 2009, Pollice et al., 2002, Zekker et al., 2012, U.S. Pat. No. 7,846,334 B2, EP 0872451 B1, and WO 2006/129132 A1). Transient anoxia can introduce a lag-time for NOB to transition from the anoxic to aerobic environment. Kornaros and Dokianakis (2010) showed delay in NOB recovery and NOB growth lag in aerobic conditions following transient anoxia, thus confirming the observations of the usefulness of transient anoxia by many others (see Allenman and Irvine, 1980, Katsogiannis et al., 2003, Sedlak, 199, Silverstein and Schroeder, 1983, Yang and Yang, 2011, and Yoo et al., 1999). Although transient anoxia has been used successfully to control NOB in 'high strength' wastes (see Wett, 2007; and U.S. Pat. No. 7,846,334 B2) supported by high free ammonia inhibition and the ability to use it in low strength wastes has been suggested (see Peng et al., 2004), the ability to control the features associated with transient anoxia without support from free ammonia inhibition remains an enigma. To summarize, strategies for controlling NOB out-selection in low-strength wastewater, which is the basis for emerging ScBNR technologies, do not yield reliable process performance, due to the lack of understanding that maximized AOB-rates become key for NOB out-selection especially when active suppression of NOB is not feasible. In this context, we define the term out-selection as an approach to repress NOBs through the achievement of higher rates for AOBs, thus producing nitrite for other organisms.

SUMMARY

The present disclosure achieves a proper and measured control of maintaining high AOB oxidation rates while achieving NOB out-selection, using various control strategies, including: 1) aeration control ensuring nearly saturated ammonia concentration and DO profiles varying from a high set-point rapidly depleting close to zero for maximized AOB-rates during aerobic phases; 2) an innovative aeration control strategy based on the ratio of on-line measured $NH_4$— and NOx signals in order to maximize total nitrogen removal and to provide an optimum stoichiometric substrate ratio for the anammox reaction; 3) aggressive aerobic SRT management for wash-out pressure on NOB; and 4) bioaugmentation of anammox and lighter flocculant AOB fraction. The use of such control strategies provides important advantages over prior art strategies.

Accordingly, the present disclosure provides a system and method of removing nitrogen from wastewater in a reactor for biological nitrogen removal, wherein an aerobic-anoxic duration and/or a concentration of dissolved oxygen in the reactor is controlled based on a ratio of an ammonia concentration to a concentration of oxidized nitrogen (NOx, sum of nitrite and nitrate concentrations) measured in real time. Typically, the aerobic-anoxic duration and/or the concentration of dissolved oxygen in the reactor is controlled to achieve a ratio of ammonia concentration to a concentration of oxidized nitrogen that is within a range of 0.5 to 1.5, preferably between 0.7 to 1.0. By employing the system and method of the present disclosure, overall nitrogen removal is maximized because denitrification (dependent on chemical oxygen demand (COD) input) and subsequent ammonia oxidation balance each other while also favoring AOB over NOB. Alternatively, instead of applying a ratio, the difference between ammonia concentration and concentration of oxidized nitrogen can be controlled to a value near 0 which leads to an equivalent control performance.

The present disclosure may be used to achieve a proper and measured control of a mainstream SND process that maximizes total inorganic nitrogen (TIN) removal through one of several nitrogen removal mechanisms including, nitrification-denitrification, nitritation-denitritation (scBNR), partial nitritation-denitritation producing an effluent stream appropriate for polishing by anammox in a separate downstream reactor, and partial nitritation-anammox in a single tank with selective anammox retention. These systems and methods use control strategies, including: 1) real time measurement of ammonia, nitrite and nitrate; 2) operational DO and the proper use of DO setpoints controlled based on a ratio of the ammonia concentration to the oxidized nitrogen concentration measured in the reactor; 3) control of a frequency of aeration based on a ratio of the ammonia concentration to the oxidized nitrogen concentration measured in the reactor; and 4) proper implementation of transient anoxia within a wide range of apparatus (reactor configurations) and operating conditions.

DETAILED DESCRIPTION

Figure 1:
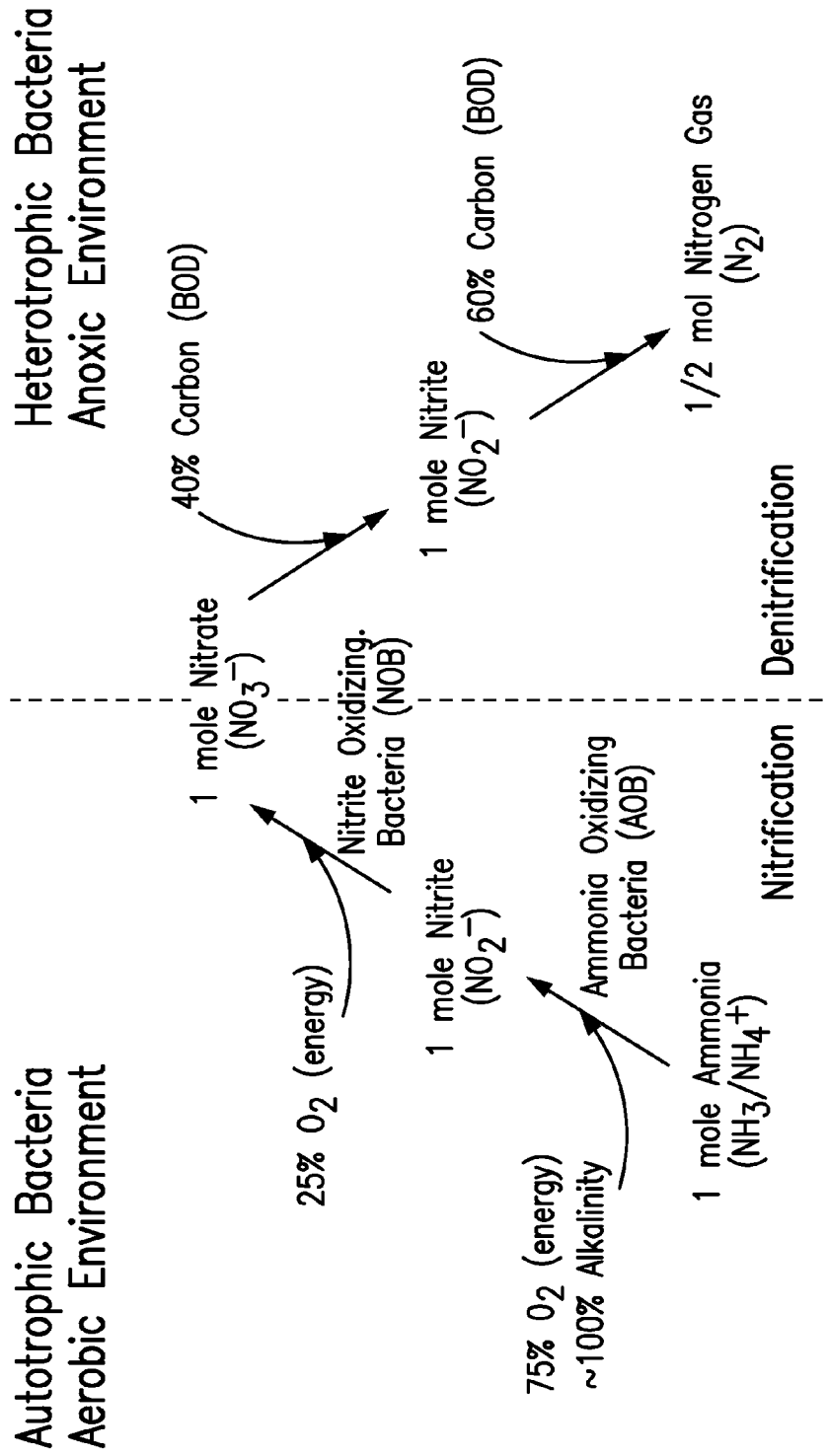
FIG. 1 is a molar flowchart showing the reactions associated with conventional nitrification and denitrification.
Figure 2:
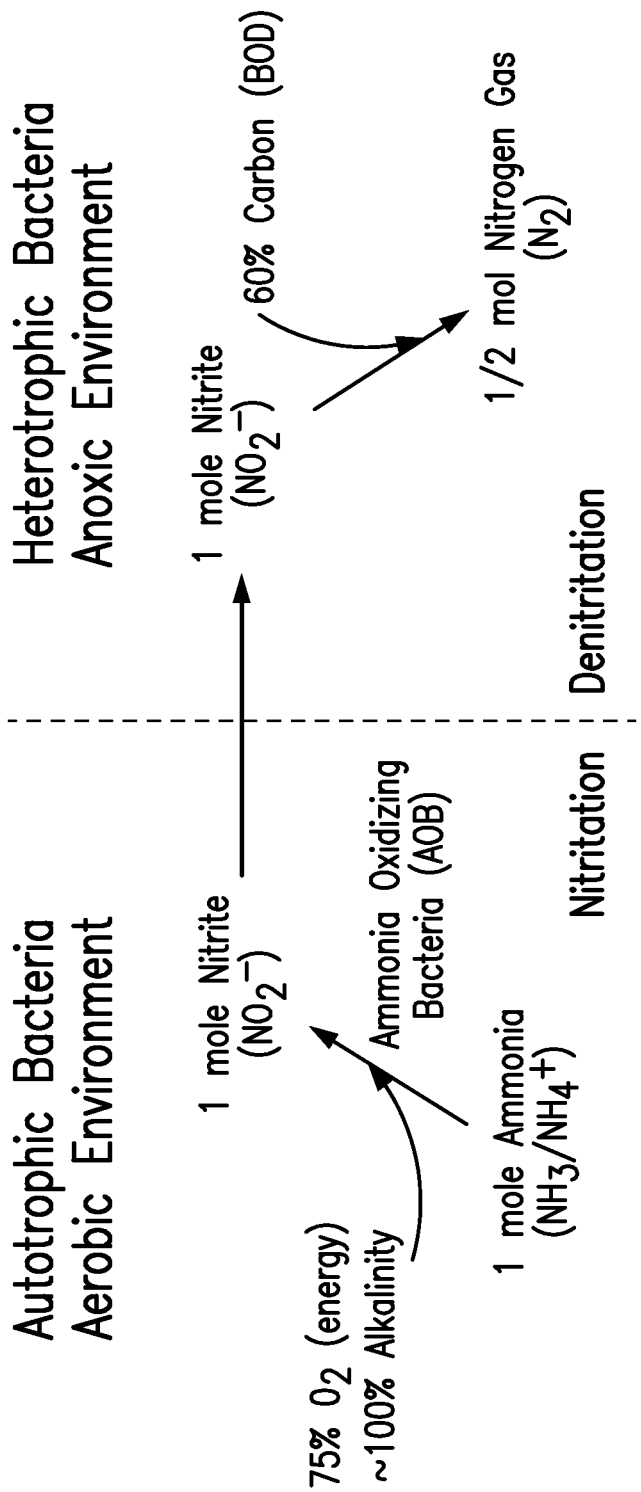
FIG. 2 is a molar flowchart showing the reactions associated with nitritation and denitritation.
Figure 3:
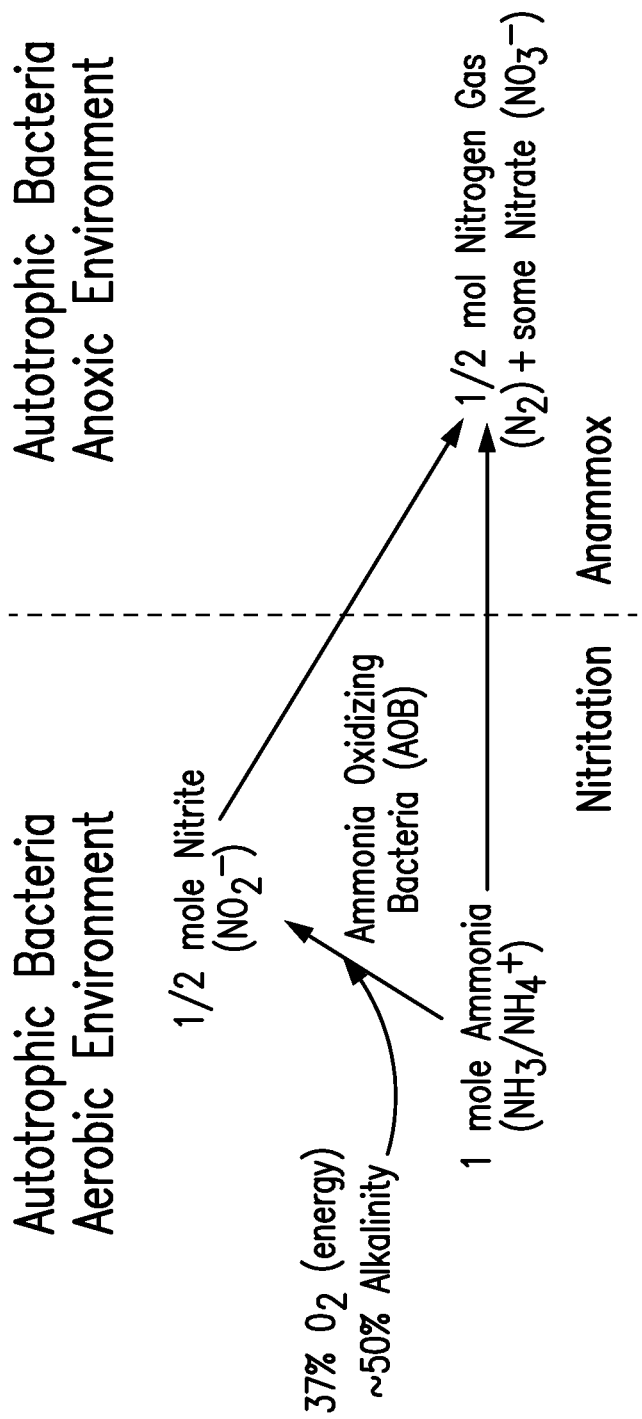
FIG. 3 is a molar flowchart showing reactions associated with deammonification.

The present disclosure develops approaches to boost AOB oxidation rates and to out-select and control NOB through ammonia, DO, bioaugmentation and transient anoxia control (NICITA). The present disclosure, associated with these four features, and controls for implementing the present disclosure, are described below. The present disclosure relates to a system and method for removing nitrogen from wastewater processed in a reactor. The system and method of the present disclosure maximizes nitrogen removal while minimizing aeration and organic carbon requirements through control of transient anoxia and aerobic SRT, out-selection of NOB, and control of dynamic DO concentrations or aeration interval by maintaining a predetermined ratio of an ammonia ($NH_4$) concentration to a concentration of oxidized nitrogen. A preferred ratio of ammonia concentration to oxidized nitrogen concentration may be between 0.7 to 1.0 but the ratio can be as great as between 0.5 and 1.5. The controller that leverages these dynamic control strategies has been named AVN ($NH_4$ vs NOx). AVN control not only maximizes the potential for TIN removal through the normal pathway (FIG. 1), but it also provides an opportunity for NOB out-selection and the associated benefits in terms of TIN removal according to FIG. 2 and FIG. 3. An additional control target is to provide the right blend of the two substrates (ammonia and nitrite) close to the actual stoichiometric ratio $NH_4$—N/NOx-N of 0.76. Instead of the ratio, alternatively the sum of [the ammonia ($NH_4$) concentration] and the negative value of [the sum of nitrite and nitrate concentrations NOx-N] can be used in the control algorithm targeting a range between −3 and +1. These target values reflect the fact that usually ammonia is more toxic to receiving water bodies and, again, the stoichiometric ratio of the anammox reaction requires 32% more nitrite than ammonia.

Ammonia: The main proposition of the present disclosure shifts away from the more typical use of temperature and free ammonia to achieve NOB out-selection. While the use of temperature to control relative growth rates of AOB and NOB is not always possible within mainstream processes, according to the present disclosure, a control feature may be employed that uses the direct measurement of ammonia itself as a controlling variable instead of free ammonia and temperature. The present disclosure uses direct control of the extent of ammonia oxidation, such that ammonia is oxidized throughout a specified reactor time cycle or a specific reactor length. Allowing residual ammonia to be maintained throughout the length of the reactor or time cycle will maintain pressure on NOB while maintaining high AOB rates.

The present disclosure makes use of direct measurement of ammonia, nitrite and nitrate and DO in the BNR reactor to control the aerobic and anoxic SRT and HRT as well as the reactor DO concentration to maximize ammonia oxidation and denitrification. The DO concentration or aeration interval or both are effectively controlled depending on the influent Carbon:Nitrogen (C/N) ratio and reactor conditions such that reactions needed to eliminate nitrogen are favored at any given time. DO is directed more to ammonia oxidation over COD oxidation, and available COD is used to drive denitrification at all times, thus, maximizing the overall nitrogen removal. The extent of ammonia oxidation allowed by the present disclosure is controlled by the availability of incoming COD for denitrification, so it is by nature that ammonia oxidation and denitrification are balanced by each other for maximum nitrogen removal. DO concentration and/or aeration duration are typically controlled to maintain approximately equal $NH_4$—N and NOx-N concentrations in the reactor at all times, the amount of $NH_4$ oxidation and thus the amount of oxygen delivered is controlled based on the amount of incoming COD available to denitrify the produced NOx. This minimizes aerobic heterotrophic COD consumption and maximizes the opportunity for denitrification, which requires time at low DO and available COD. The controller allows the input of offsets that would allow the $NH_4$—N or the NOx-N concentration to be removed to meet specific discharge limits for these parameters. For example, the controller could be tuned to ensure compliance with an $NH_4$ limit by setting the controller to provide an effluent that contains $NH_4$ at 20-90% of the effluent NOx-N concentration.

Dissolved Oxygen: While the papers discussed above proposed the differences in affinities (e.g., stronger adaptation to low DO-concentration for NOB compared to AOB), the opportunities to employ these differences in a control scheme were discovered by the present inventors. Thus, surprisingly and contrary to previous interpretations, transiently high DO-operation appears more appropriate to out-compete NOB. The case for using higher DO levels is a differentiator in the present disclosure from the prior art. The higher DO (>1.0 mg/L) not only maintains high AOB rates, but also manages the relative substrate affinities of AOB and NOB towards NOB out-selection.

Figure 4:
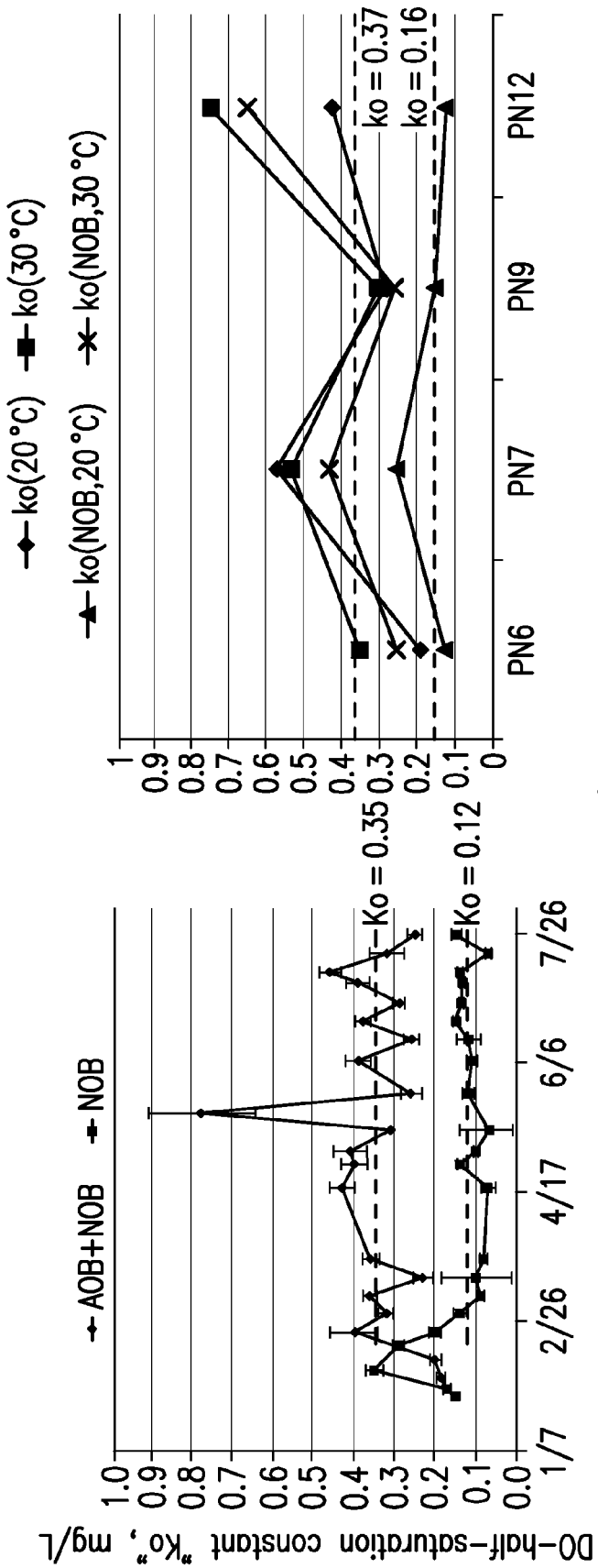
FIG. 4 is a line graph comparing collected data of $K_O$-values of total nitrifiers (AOB+NOB) and NOB only in bench-scale batch-reactors at Blue Plains Waste Water Treatment Plant (WWTP) (left) and in full-scale at Strass WWTP (right).
Figure 5:
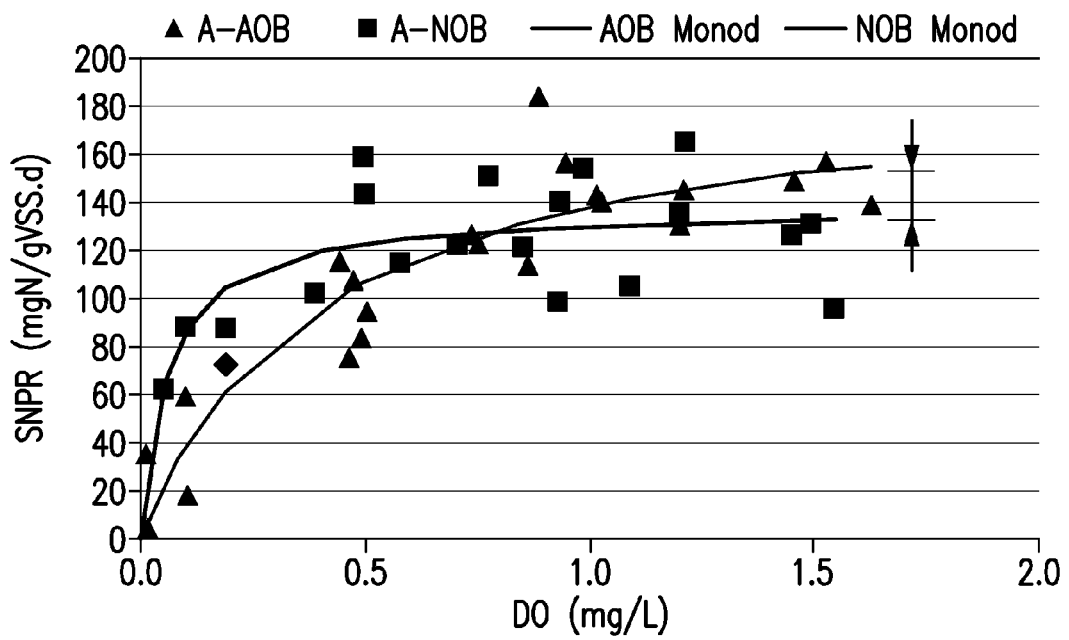
FIG. 5 is a graph (left) showing plotted test data of specific nitrogen process rates in terms of ammonia removal per gram of Volatile Suspended Solids (VSS) and day depending on the DO-setpoint of the intermittent aeration of the batch reactors at Blue Plains WWTP; Monod expressions (right) are fitted to the measured data by applying least square error minimization (the arrow indicates 15% higher N-processing rates of AOB at a DO-level of 1.5 mg/L).
Figure 6:
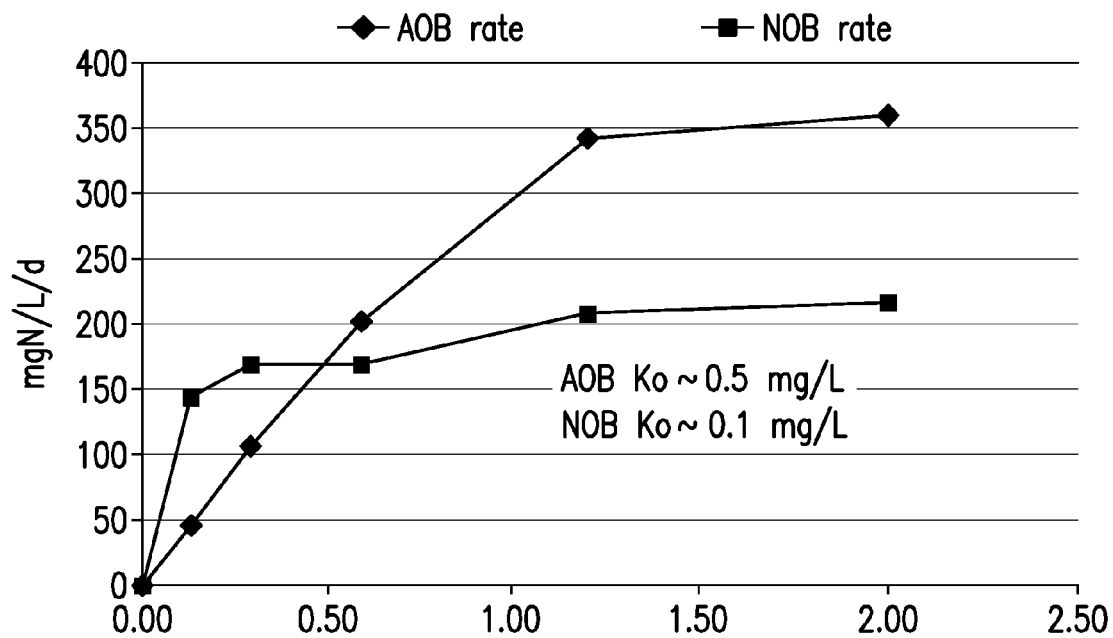
FIG. 6 is a line graph comparing collected data of $K_O$-values of AOB and NOB in a nitritation reactor at Hampton Roads Sanitation District (HRSD) WWTP.

As described above and shown in FIGS. 4-6 for three different plant configurations, ammonia oxidation occurs at a faster rate at high DO concentrations (i.e., concentrations greater than 1 mg/L) compared to nitrite oxidation. Therefore, it was desired to operate the BNR reactor at transiently high DO concentration such that AOB growth is favored over NOB. This strategy is in opposition to the large body of literature that indicates high oxygen affinity of AOB compared to NOB, and the preferred operation at low DO concentrations to out-select NOB.

Bioaugmentation: Different from the prior art approach, which aims to bioaugment the entire biomass from a high strength process, the present disclosure aims to select the lighter biomass fraction (i.e., the overflow instead of the underflow of the hydrocyclone) containing predominantly AOB, in order to bioaugment the relatively fast growing AOB from the sidestream reactor to the mainstream, without uncontrolled loss of anammox activity in the sidestream reactor undergoing deammonification. The selection of the lighter or finer biomass fraction using a cyclone, or sieve, or the unattached biomass separated from biofilm carrier media, allows a maximum seeding rate which helps to suppress NOB in both the high-strength reactor (selectively decreasing SRT) and the low-strength system (transfer of AOB but almost no NOB). In a similar manner, bioaugmentation of anammox organisms from a sidestream or high strength reactor is also possible. The present disclosure provides for bioaugmentation of anammox to a mainstream BNR reactor A (FIG. 7), where the DO is maintained >1.0 mg/L to inhibit NOBs. The bioaugmented organisms under optimum conditions are retained and allowed to grow in the BNR reactor A.

Figure 7:
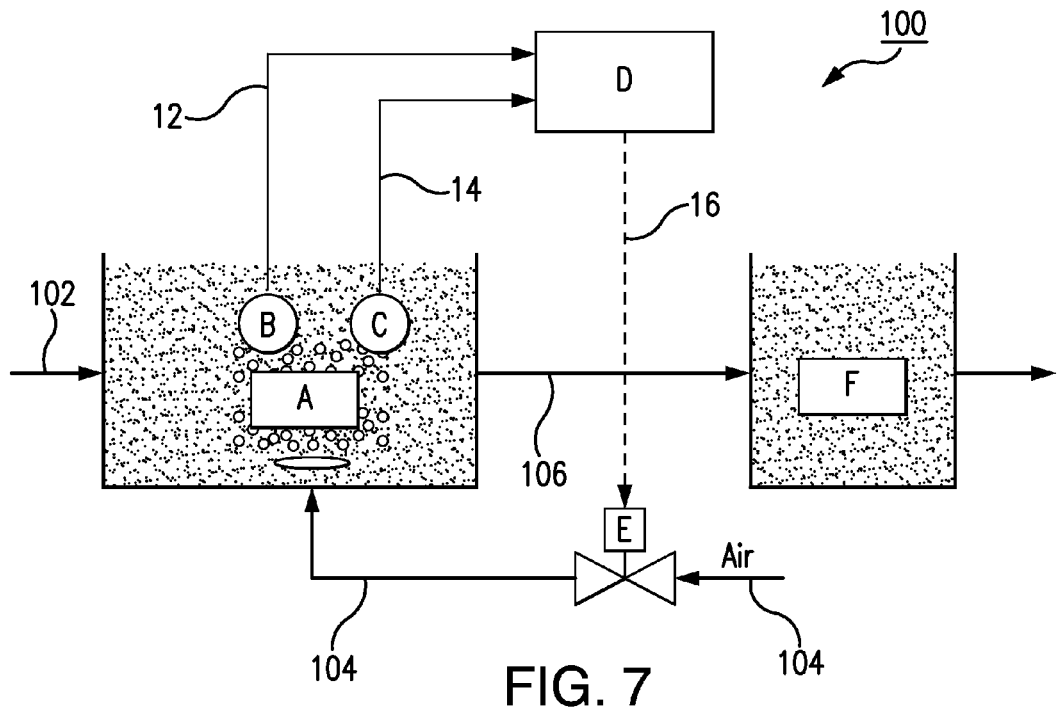
FIG. 7 is a schematic view of a system for implementing the present disclosure.

FIG. 7 illustrates a system 100 for removing nitrogen from wastewater 102. The system 100 includes a reactor A for performing biological nitrogen removal on the wastewater 102. Analyzers B, C are located in the reactor A. The first analyzer B senses ammonia in the reactor A, and generates a corresponding ammonia signal 12, expressed on an as nitrogen basis. The second analyzer C senses nitrite, nitrate, or a combination of nitrite and nitrate in the reactor A, and generates a corresponding nitrite, nitrate, or a combination of nitrite and nitrate signal 14, all expressed on an as nitrogen basis. A controller D receives the signals 12, 14 and uses the signals 12, 14 to generate a command signal 16 to an air-flow control device E. The device E operates under the control of the command signal 16 to modulate the flow of air or the time of aeration 104 supplied to the reactor A. Thus, the amount of air 104 that is supplied to the reactor A is based on the control signal 16 received from the controller D. Effluent 106 from the reactor A is supplied to a second reactor F. The effluent 106 is suited for further removal of remaining nitrogen, and such further removal of nitrogen is performed by the second reactor F.

Transient Anoxia: The present disclosure also provides for rapid transition to or from anoxia. The case for rapid transition to anoxia from a high DO into anoxia is another subject of the present disclosure. Rapid transitions to anoxia not only allow little opportunity for NOB to grow, rapid transitions from anoxia back to a high DO set point also allow for the inhibition of the growth of NOB. The rapid transition from anoxia can also produce intermediates that are inhibitory to NOB. It is by nature that nitrite oxidation follows ammonia oxidation. Most models use a substrate half saturation based on the Monod equation (Monod, 1949) to describe the ability to use both the electron donor and acceptor. In a rapidly changing DO environment, some nitrite is likely to accumulate towards the end of ammonia oxidation based on substrate half saturation associated with NOB. In that situation, if the aeration is continued, the residual nitrite will eventually be converted to nitrate by NOB; however, if aeration is discontinued and the conditions are allowed to rapidly transition to anoxia, the remaining nitrite will be 'anoxically' reduced by either chemical oxygen demand (COD) driven heterotrophic denitrifiers in nitrite-shunt processes or by anammox in a single stage deammonification processes. Hence, nitrite-reducing bacteria (e.g., heterotrophic denitrifiers or anammox) may out-compete the NOB (by consuming nitrite), thereby creating pressure on NOB by limiting the availability of their substrate. The NOB population will gain less and less energy in every subsequent cycle, further reducing the active population thereof. Therefore, it is critical to restrict aeration and to rapidly transition to anoxia at the end of ammonia oxidation such that NOB are deprived of DO when nitrite is available.

Figure 8:
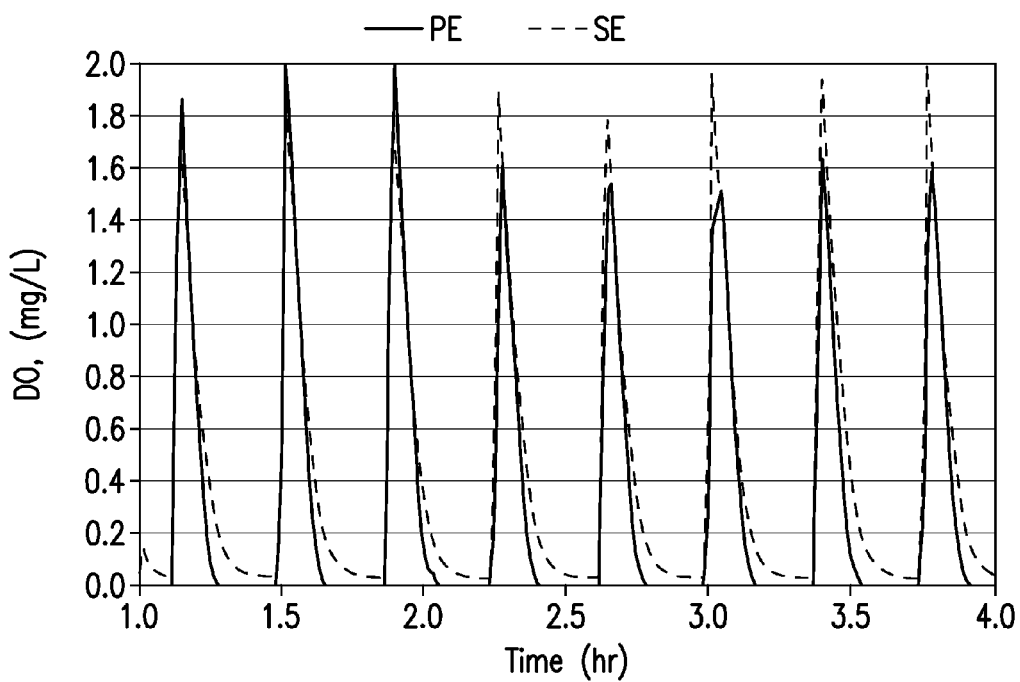
FIG. 8 is a temporal graph comparison of DO depletion curves between two identical sequencing batch reactors SBRs operated with the same aeration regime, one being fed with primary treated effluent (PE) and the other with secondary treated effluent (SE). Note the higher chemical oxygen demand (COD) in the PE fed system allows for more rapid transitions to anoxia from high DO setting.
Figure 9:
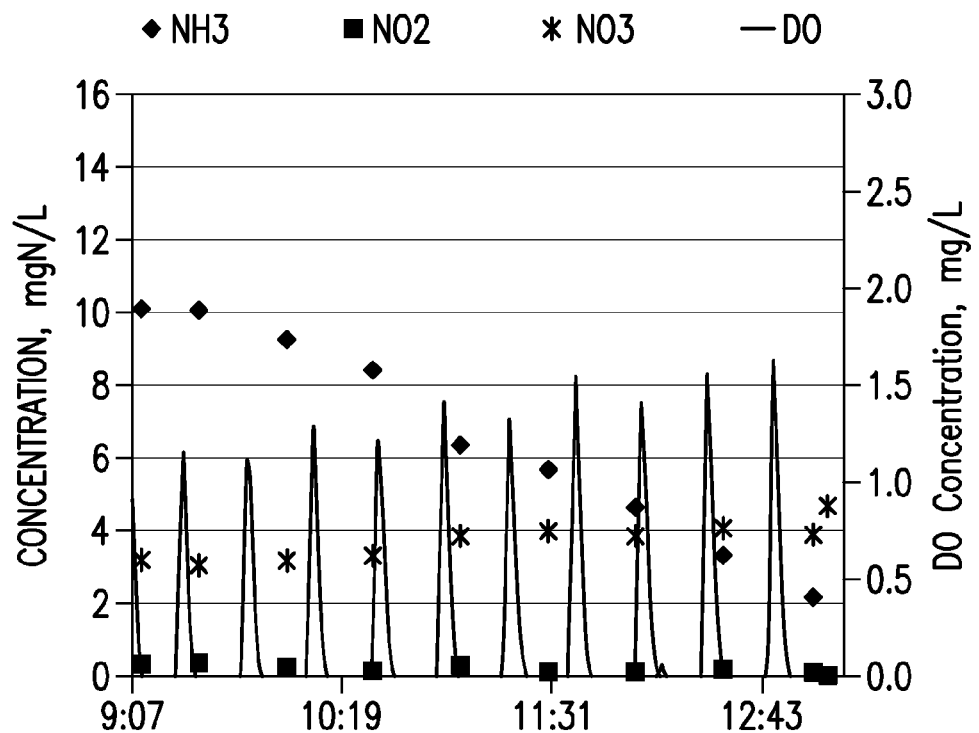
FIG. 9 is a graph comparing Nitrogen species ($NH_3$, $NO_2$ and $NO_3$) profiles during reaction phase in SBR configuration operated with intermittent aeration [residual ammonia].
Figure 10:
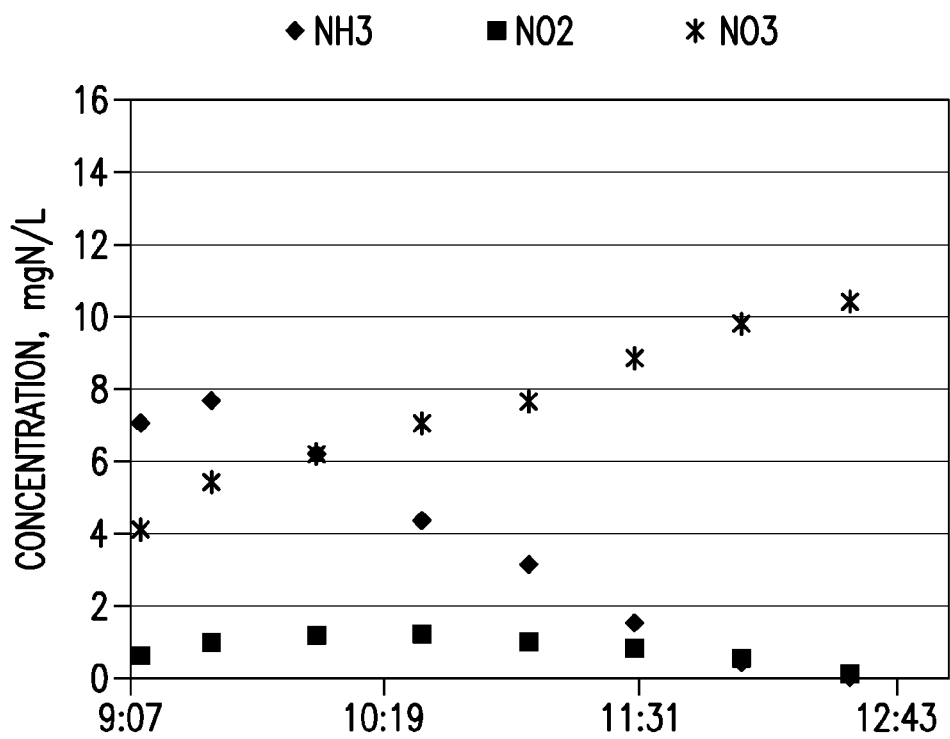
FIG. 10 is a graph comparing Nitrogen species ($NH_3$, $NO_2$ and $NO_3$) profiles during reaction phase in SBR configuration operated with intermittent aeration [no residual ammonia].
Figure 13:
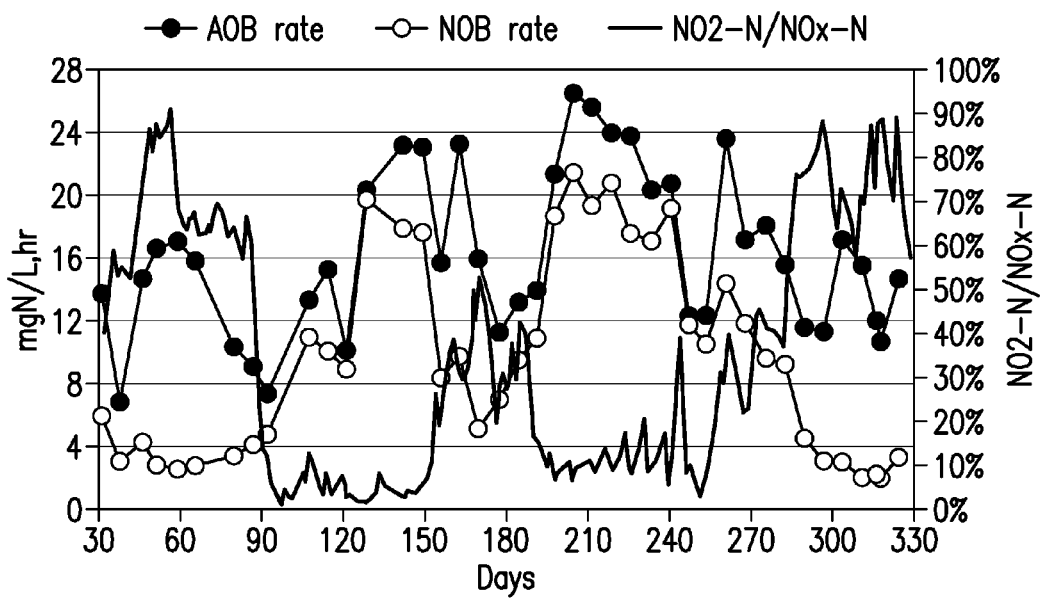
FIG. 13 is a graph that shows extent of NOB out-selection by comparing AOB and NOB rates and resulting nitrite accumulation in nitrite-shunt reactor at HRSD WWTP.

According to the present disclosure, rapid transitions to anoxia are allowed for by maintaining higher oxygen uptake rates (anoxia achieved within 10 minutes) through an increase in mixed liquor solids concentration (approximately 2 g/L [between 1.5 g/L and 4.0 g/L]), or by introducing COD (C/N>2) in the anoxic phase to rapidly scavenge oxygen. Another approach is to increase the temperature (such as using waste heat from turbines or engines) and thus the growth rates of all organisms. FIG. 8 shows an example of this comparing the DO profiles for two SBR systems operated in intermittent aeration mode where one was fed a primary treated effluent and the other was fed secondary treated effluent. Under this strategy, the $NH_4$—N is measured and maintained either within certain predetermined $NH_4$—N set points or at a single setpoint with appropriate bandwidth or equal reactor NOx-N concentration, which depends on the hydraulic regime of the reactor. This approach eliminates the concern of over-aerating after the near completion of ammonia oxidation as residual ammonia is always maintained, which further helps to maintain high AOB rates. Hence, according to the present disclosure, it is possible to exploit known NOB out-selection strategies with use of a robust control algorithm based on direct ammonia, nitrite, and nitrate and DO signals. Rapid transition from anoxia to an aerated state is achieved using appropriate aeration devices that can rapidly supply air or through sequential aerobic and anoxic zones. Appropriate aeration device in this context is extra-capacity for oxygen supply by the blower and diffusers in relation to the aeration capacity needed assuming a steady oxygen uptake at given DO-set-point during the aerated periods. This extra-capacity (about 10-25% beyond the baseline design) is needed to accelerate DO-increase from the lower set-point (<0.1 mg/L) to the upper set-point (>1.0 mg/L). FIG. 9 and FIG. 13 demonstrate the performance of this strategy in controlling NOB to achieve ScBNR in a nitrite-shunt system and single stage deammonification system, respectively. FIG. 10 illustrates the negative impact of over aerating (indicated by no residual ammonia) on NOB out-selection (indicated by nitrate production).

Specific controls for controlling NOB through these four possible features (ammonia, DO, bioaugmentation and transient anoxia control) are described as follows:

Aerobic SRT and DO setpoint: It is desirable to maintain a DO setpoint as much above 1 mg/L as practicable. A higher DO setpoint allows for a more rapid growth of AOB over NOB. However, a very high DO setpoint increases the time-to-transition to anoxia. One approach that has been successfully used for achieving this high DO strategy is described in the control narrative below. It should be noted that this high DO strategy is in opposition to the conventional wisdom of achieving nitrite shunt for low strength and to the actual practice of achieving nitrite shunt in high strength and high temperature waste streams.

The aerobic SRT is controlled through two approaches. An increase in solids wasted decreases the total and aerobic SRT. A second approach to decreasing the aerobic SRT is by increasing the anoxic time step during transient anoxia. In an intermittently aerated (in time or space) BNR reactor operated under AVN and ammonia control strategy, the aerobic SRT is determined by aeration needs of AOB to oxidize ammonia to nitrite such that i) $NH_4$—N concentration is equal to NOx-N concentration or ii) $NH_4$—N concentration is equal to the setpoint. For example, if AOB's ammonia oxidation rate is lower, more aeration (time or higher DO concentration or both) will be required to maintain this condition compared to when AOB rates are higher. In such a scenario, intentional lowering of the total SRT gradually results in a reduction in AOB ammonia oxidation rate at a certain DO value. Consequently, AOB require more aeration to increase their growth rate and to meet the desired condition ($NH_4$—N=NOx-N or a setpoint) causing the operational high DO set point (in time) and aerobic HRT (in space) to increase and be at a point where the growth of AOB is favored over growth of NOB.

Aggressive SRT control is not commonly accepted as a means for achieving nitrite shunt, which also coincides with inability to sustain stable NOB out-selection. When the BNR reactor is operated at high DO set points, AOB grow faster than NOB, which allows the system to be operated at low SRT further disadvantaging NOB. In addition, the application of aggressive SRT pressure is easily controlled according to the present disclosure. Since the ammonia, nitrite and nitrate concentrations determine the operational high DO set points or aeration duration (in time) and aerated fraction (in space), the present disclosure provides an uncomplicated system for controlling the total SRT such that the DO remains at a high concentration, in excess of 1 mg/L.

External and internal inhibitors or toxicants of NOB: The decrease in net growth rate of NOB is possible through the exposure of NOB to inhibitors or toxic substances such as but not limited to free ammonia, free nitrous acid, and other natural or synthetic substances. It is also conceivable to take advantage of internally (within the wastewater treatment plant) generated nitrogenous metabolites such as nitric oxide, hydroxylamine, hydrazine and so forth or other treatment plant intermediates (such as from thermal hydrolysis or other fermentation processes) to inhibit NOB by controlling production of these intermediates as needed. Inhibitors can also be added to the process to reduce growth rates of NOBs.

Growth enhancers for AOB and anammox: The use of growth enhancers for AOBs or anammox is also possible. One approach for example is to use hydrazine as a growth enhancer for anammox while at the same time being a toxicant for NOBs. The overall goal of using inhibitor or growth enhancers is to increase and differentiate relative growth rates of AOB or anammox versus NOB to eventually out-select NOBs.

Post anoxic nitrogen removal: The effluent from the BNR process A (FIG. 7) containing ammonia, nitrite, and nitrate can be further treated in a post anoxic process F that uses microorganisms such as but not limited to anammox with or without addition of organic electron donor. The BNR reactor A and reactor F can be integrated reactors (using a single solid-liquid separation device) or separate reactors (with a solid-liquid separation device between them). The fully anoxic reactor F is configured to selectively retain anammox bacteria, using several types of process options such as an activated sludge post-anoxic reactor, granular sludge reactor, a moving bed biofilm reactor, an integrated fixed film activated sludge reactor, a biologically active filter, or a membrane bioreactor. The organic external electron donor for such nitrogen removal may include but is not restricted to organic carbon sources such as acetate, acetic acid, methanol, ethanol, glycerol, sugars and combinations thereof or inorganic sources such as sulfide, elemental sulfur, elemental iron, etc. Post anoxia also allows for an increase in yield of anammox organisms within the reactor F, with possible recycle of excess of these organisms to reactor A.

Reactor configurations: Several apparatus are available to execute this AOB oxidation and NOB out-selection framework, including complete mixed reactors, sequencing batch reactors, oxidation ditches and plug flow reactors. It should be noted that the reactor apparatus can be adjusted to deliver the control features for achieving SRT, ammonia oxidation requirements, high DO setting and anoxia transitions, where possible, by providing mechanical and hydraulic flexibility for attaining dissolved oxygen settings and anoxic in space or anoxic in time settings. Swing-zones (facultatively aerated reactor volume) or reactors to accommodate variable flows and loads that are typical to a wastewater treatment process can be provided. Apart from suspended growth reactors, biofilm, granular sludge or hybrids of these reactors are also feasible. Finally, the solid-liquid separation could occur using any separation device including clarifiers, membranes or dissolved air floatation tanks.

Plug flow reactors are characterized as continuously fed reactors with very high length to width ratio and can be simulated as a series of completely mixed reactors where the pollutant concentration decreases along the flow pathway across the reactor's length (i.e. concentration gradient). In plug flow continuously fed reactors, which are more commonly used in large treatment plants, the process controls to achieve ScBNR can be addressed using two configurations: (1) controlling aeration in space by alternating between aerobic and anaerobic zones; and (2) controlling aeration in time by cycling air throughout the reactor in "air on" and "air off" sequence similar to SBR configuration. Other features requiring control of mixed liquor and aerobic/anoxic transitions are similar to the SBR scheme described above.

Control Strategies: Several control strategies are available that can be applied in the above-mentioned reactor configurations that make use of features of the present disclosure to achieve maximum TIN removal and can be extended to NOB out-selection. A few exemplary strategies are described below, optimized for various configurations.

Figure 12:
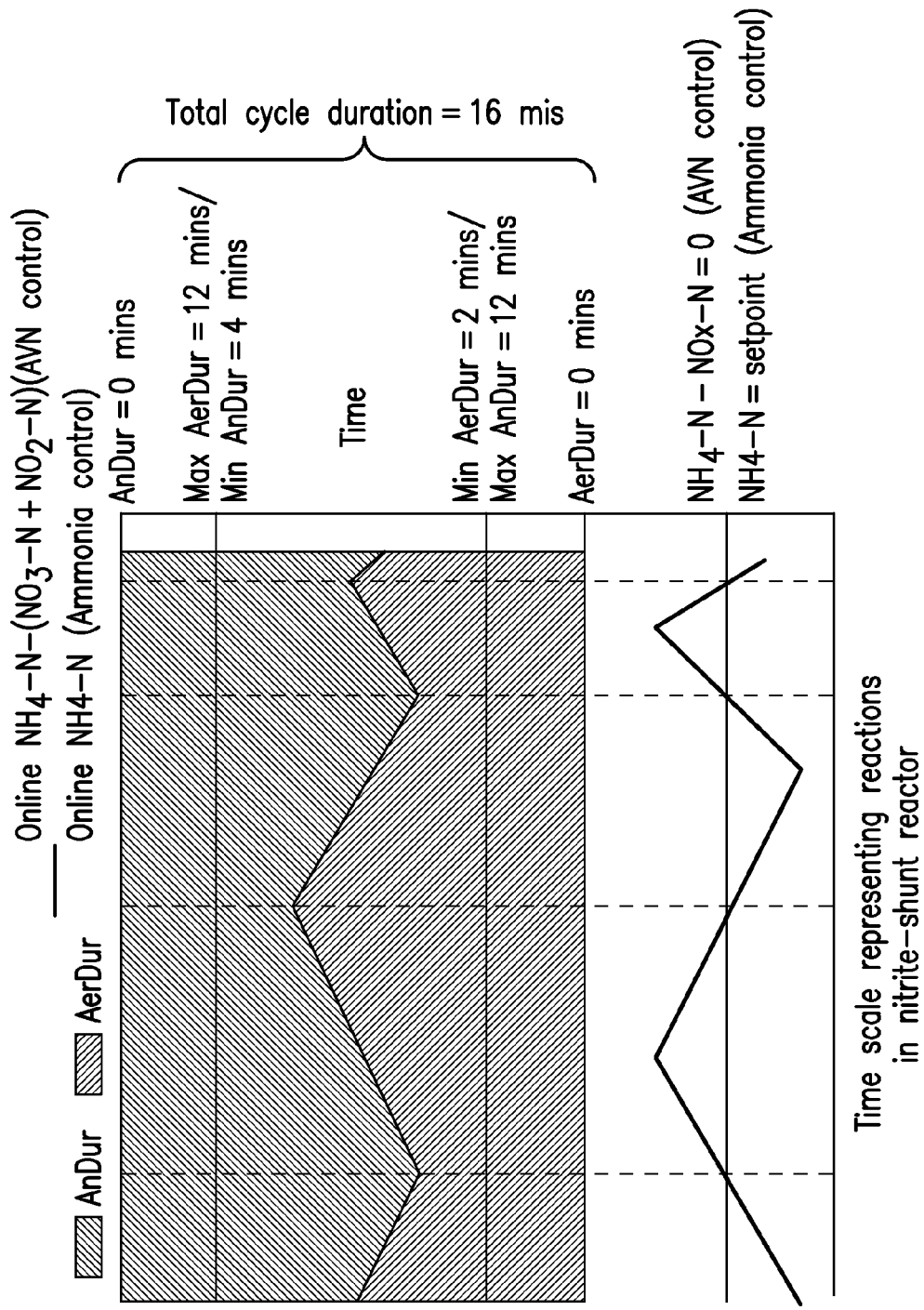
FIG. 12 is a graph depicting ammonia vs NOx (AVN) and ammonia control adjusting aerobic and anoxic duration with fluctuations in ($NH_4^+$—N—NOx-N) and $NH_4^+$—N.

Control Strategy A (Aerobic-Anoxic duration control): In this strategy, a DO set point is fixed while aerobic and anoxic duration is variable. The total aerobic-anoxic cycle time can be maintained at certain set point while allowing aerobic and anoxic durations to vary. In another instance, anoxic duration can be fixed, allowing the controller to modify only the aerobic duration, such that overall anoxic+aerobic duration remains dynamic depending on the nitrogen removal potential. Mechanical mixing should be provided when aeration is not provided. In this example, aerobic and anoxic duration is variable between 4 minutes to 12 minutes within the cycle time of 16 minutes (FIG. 12). When the $NH_4$—N in the reactor is greater than the NOx-N (AVN control) and ammonia setpoint (ammonia control), the aerobic duration is increased until the $NH_4$—N gets below NOx-N and setpoint. When the $NH_4$—N concentration is lower than the NOx-N, the aerobic duration is decreased until the $NH_4$—N concentration gets higher NOx-N and ammonia setpoint (FIG. 12). When aerated DO is maintained at >1.5 mg/L, higher ammonia oxidation rates are supported compared to nitrite oxidation rates as discussed above. Offsets can be applied as discussed above to allow for a higher effluent $NH_4$ versus NOx or vice versa as desired.

In this exemplary embodiment, a BNR reactor 20 (FIG. 11) may be fitted with DO, ammonia, nitrite and nitrate sensors (or analyzers) 22, 24, 26. It will be possible to have any suitable reactor configuration where the control can occur either in time or in space. In case of multiple or plug flow reactors, multiple DO probes are installed along each major section along a train, while an ammonia, nitrite and nitrate probe will be installed strategically in a latter reactor or section, to manage reaction rates such that small amounts of ammonia concentration remain at the end of the reactor and such that the reactor effluent contains $NH_4$—N concentrations approximately equal to NOx-N (AVN control) or the ammonia setpoint (ammonia control).

Control Strategy B (DO intensity control): Under this strategy operational DO is variable and controlled by the $NH_4$—N and NOx-N concentrations in the BNR reactor that will optimize the DO for high ammonia oxidation rate and under anoxia, heterotrophic denitrification or anammox-driven ammonia oxidation. This approach is valid in a wide range of reactor configurations including plug flow, complete mix, complete mix reactors in series, and sequencing batch reactor. Under this approach, the DO cycles between the low DO setpoint (which is fixed) and a variable high DO setpoint, usually greater than 1 mg/L and controlled by reactor $NH_4$—N compared to setpoint (ammonia control) or NOx-N concentrations (AVN control). An aggressive aerobic SRT is maintained to increase the demand for oxygen, thus allowing for the controller to automatically increase the DO levels to greater than 1 mg/L. In this control strategy, the aerobic and anoxic periods are dictated by the aeration requirement for AOB's to meet the objective for $NH_4$—N to be near setpoint (ammonia control) or NOx-N concentration (AVN control).

Control Strategy C (Swing zone control): Ammonia and AVN control can also be used in plug flow or step-feed (several feed points in successive anoxic zones) tank with multiple sequential aerobic and anoxic swing-zones in series. Controls (swing-zones that can be aerated or remain anoxic) affect which zones in series are maintained anoxic or aerobically to achieve the control objective.

Figure 14:
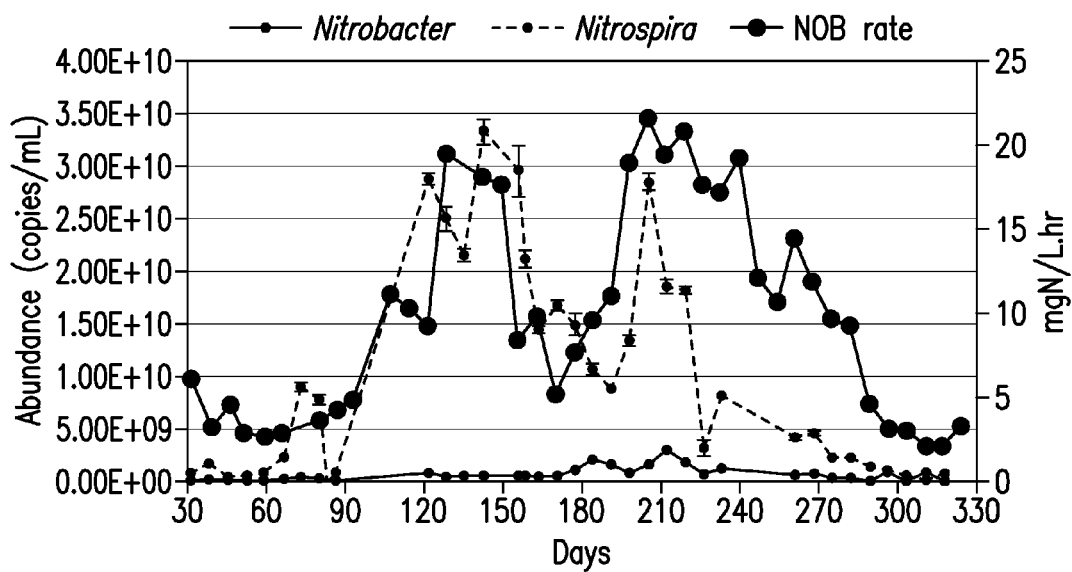
FIG. 14 is graph comparing NOB rates and NOB population through quantitative polymerase chain reaction (qPCR) measurements.

Examples of the control strategy include but are not limited to the following:

1. Nitrite-shunt: The system for removing nitrogen in a reactor 20 (FIG. 11) for biological nitrogen removal from wastewaters of the present disclosure was operated with 2-3 hr hydraulic residence time (HRT), ~5 day SRT, 3500±500 mg/L mixed liquor suspended solids (MLSS) at 25° C. The reactor was operated under the AVN control strategies shown in FIGS. 11-12. FIG. 13 represents the NOB out-selection that was observed. FIG. 14 shows the trend of dominant NOB (Nitrospira) matches that of the NOB rate measurements, which clearly verifies the NOB out-selection that was observed.

Figure 15:
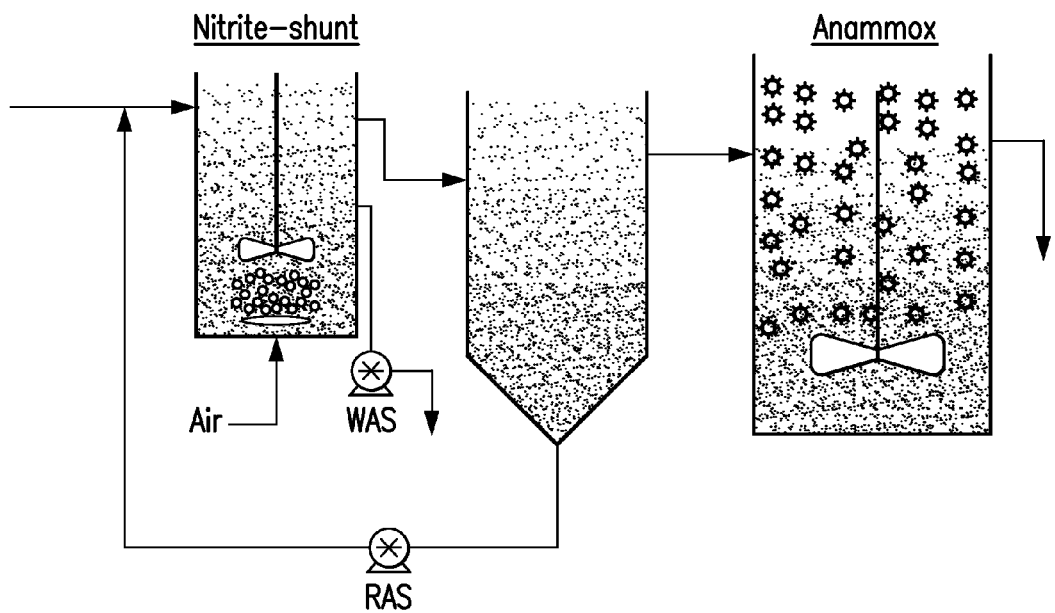
FIG. 15 depicts a mainstream deammonification pilot which has a nitrite-shunt continuously-stirred tank reactor (CSTR) followed by anammox moving bed bioreactor (MBBR).
Figure 16:
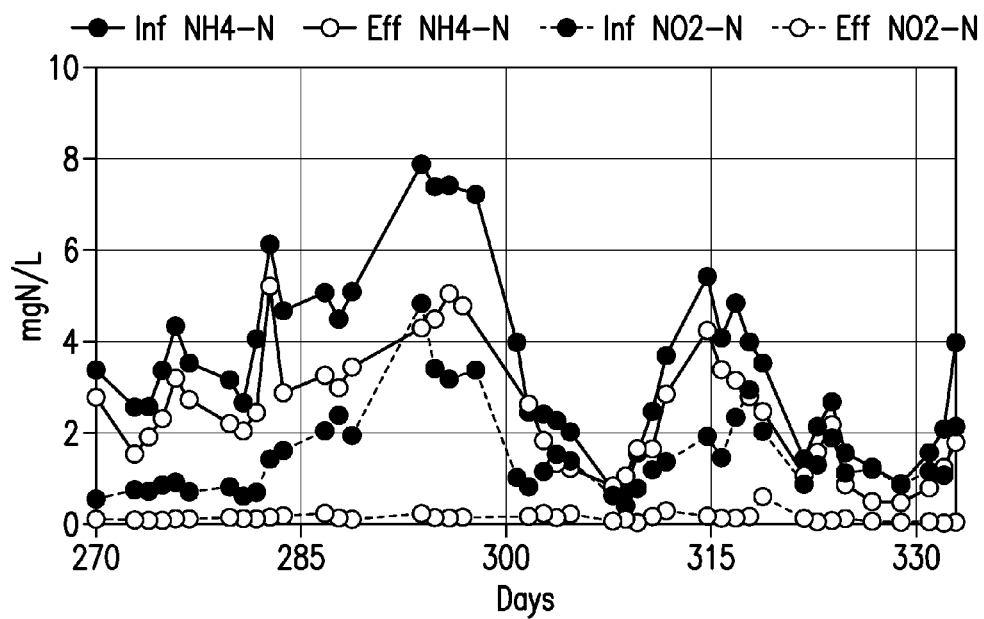
FIG. 16 presents influent and effluent ammonia and nitrite from the anammox MBBR.

2. Anammox polishing: FIG. 15 represents nitrite-shunt reactor from example above followed by fully un-aerated and mixed anammox MBBR for nitrogen polishing. The reactor was operated at 4 hr HRT with 50% K3 (AnoxKaldnes) media fill. The anammox MBBR showed near complete removal of $NO_2^2$ (anammox effluent $NO_2^-$—N=0.16±0.09 mg/L), while $NH_4+$ removal has been limited by the level of $NO_2^-$ accumulation in nitrite-shunt effluent (FIG. 16).

Figure 11:
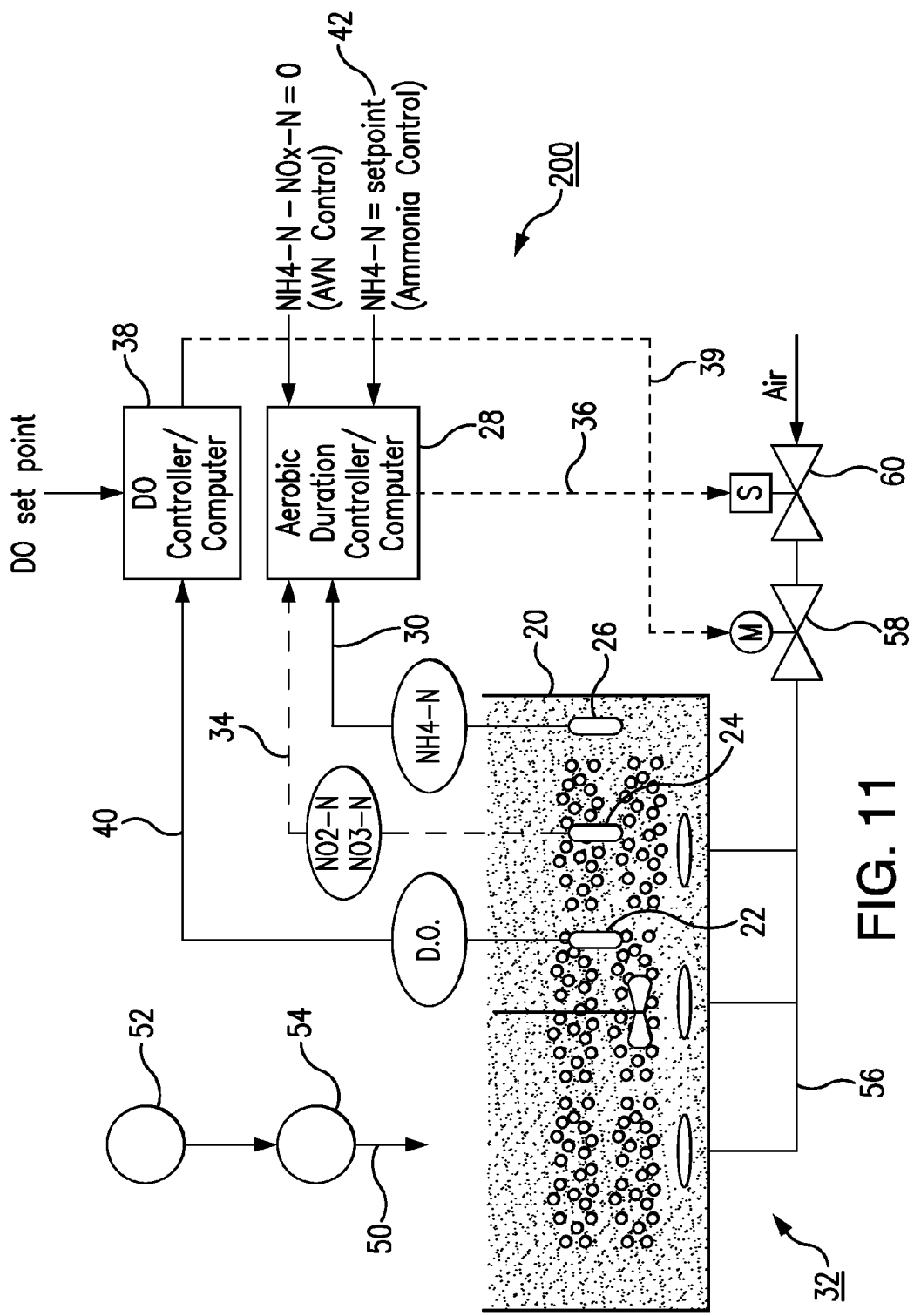
FIG. 11 is a lateral cross-sectional view of a BNR reactor fitted with mechanical mixer, air diffuser, ammonia, nitrite, and nitrate and DO analyzers.

Referring now to FIG. 11, a system 200 for implementing the present disclosure may include a biological nitrogen removal reactor 20, an ammonia analyzer 26, and a controller 28 for processing an ammonia concentration signal 30, for targeting out-selection of NOB under controlled transient anoxia conditions. According to the present disclosure, the conditions may be controlled either along the flow-path or along the process time-line. In operation, the DO profile of the reactor 20 switches between a lower DO set point of less than 0.1 mg/L and an upper DO set point of greater than 1.0 mg/L, and an activation interval of an aeration system 32, the upper DO set point, or both are set such that an on-line measured ammonia concentration (30) is higher than 1.5 mg/L as ammonia nitrogen is more than 75% of the transiently aerated reactor volume in space or time.

The FIG. 11 system may additionally include an analyzer 24 that senses the concentration of oxidized nitrogen in the reactor 20, and which generates concentration signals 34 representing nitrite, nitrate or combination of nitrite and nitrate. In operation, the controller 28 processes the signals 30, 34 for concentrations of ammonia and oxidized nitrogen, to control (36) DO concentration or the duration of the aerobic period and/or the duration of the anoxic period in the reactor 20, based on the ratio or sum of the concentration of ammonia and concentration of oxidized nitrogen in the reactor 20.

Controllers 28, 38 may be used to generate instructions 36, 39 for increasing, decreasing or maintaining the concentration of dissolved oxygen (40) or the duration of the aerobic period and/or the duration of the anoxic period, to maintain a ratio of concentration of ammonia to a concentration of oxidized nitrogen that is from about 0.5 to 1.5, or to maintain a sum of the concentration of ammonia plus the negative value of the concentration of oxidized nitrogen that is from −3.0 to +1.0.

According to the present disclosure, the reactor 20 may have a limited aerobic sludge retention time just sufficient to reach the ammonia set point 42 by controlled extension of anoxic periods or volume and by operating a high sludge wasting rate such that the sludge wasting rate is controlled to maintain high DO (40) of greater than 1 mg/L in the case of DO intensity control, or to increase aerobic duration by decreasing anoxic duration in the case of aerobic/anoxic duration control such that minimum aerobic fraction is provided.

Further, the system 200 may include a bioaugmentation of AOB 50 produced from a high ammonia strength reactor 52, defined as having in excess of 200 mg/L ammonia as nitrogen in the feed, wherein the less dense or more compressible or unattached sludge fraction is selected from the high ammonia strength reactor 52 for the bioaugmentation by an appropriate device 54 such as a cyclone, centrifuge, lamella settler, screen, or integrated biofilm reactor, and fed (50) to the reactor 20 at a maximum rate leading to a retention time of the bioaugmentation fraction of less than 10 days in the high ammonia strength reactor 52.

In operation, the controller 28 receives the ammonia concentration signal 30 and the nitrite concentration signal, nitrate concentration signal or a combination of nitrite and nitrate concentration signals 34 and generates instructions 36 for increasing, decreasing or maintaining a concentration of DO or aerobic and anoxic duration in the reactor 20 based on a ratio or sum of the concentration of ammonia to concentration of oxidized nitrogen in the reactor 20.

According to the present disclosure, the main plant nitrogen removal reactor 20 may contain bioaugmentation 50 of anammox organisms from the high ammonia strength reactor 52, in order to provide microbial competitors for nitrite which help to out-select NOB.

According to the present disclosure, the reactor 20 may maintain an oxygen uptake rate which allows for rapid transition to anoxia within the reactor 20 of less than 10 minutes from an aerated state and uses appropriate aeration devices 32, 56, 58, 60 that allow for rapid transition from anoxia to an aerated condition.

Referring again to FIG. 7, the analyzer C may be used to sense concentration of oxidized nitrogen in the reactor A. The analyzer C generates concentration signals 14 that can be representative of nitrite, nitrate or combination of nitrite and nitrate concentrations, and the controller D processes the signals 12, 14 for concentrations of ammonia and oxidized nitrogen, respectively, and controls (16) DO concentration or the duration of the aerobic period and/or the duration of the anoxic period in the reactor A based on the ratio or sum of the concentration of ammonia and concentration of oxidized nitrogen. The effluent 106 produced by the controlled process is fed into a fully anoxic configuration F, that can selectively grow and retain anammox bacteria. The latter configuration F may be an integrated or separate, post-anoxic activated sludge reactor, granular sludge reactor, a moving bed biofilm reactor, integrated fixed film activated sludge reactor, a biologically active filter, or a membrane bioreactor with possible recycle or bioaugmentation of excess biomass from such reactor F to the upstream BNR reactor A.

In operation, the effluent stream 106 (FIG. 7) from the reactor A contains a blend of ammonia, nitrite, and nitrate, such that further nitrogen removal can be accomplished using anammox in a fully anoxic suspended or biofilm reactor F, in which acetate, acetic acid or some other organic or inorganic substrate or combination of substrates are added, accomplishing selective reduction of nitrate to nitrite by anammox or other microorganisms and subsequent nitrite and ammonia removal by anammox.

If desired, the NOB net observed growth rate may be decreased by exposure to inhibitors, nitrogenous metabolic intermediates or toxic substances such as free nitrous acid, hydrazine, free ammonia, hydroxylamine, and nitric oxide. Further, if desired, AOB and anammox net growth rates may be increased using growth factors such as hydrazine.

DOCUMENTS REFERENCED ABOVE

U.S. Patent Documents

| | | |
|---|---|---|
| 2010/0233777 A1 | September 2010 | Chandran et al |
| 6,485,646 B1 | November 2002 | Dijkman et al. |
| 2011/0198284 A1 | August 2011 | Nyhuis |
| 2011/0253625A1 | October 2011 | Takeda et al. |
| 7,846,334 B2 | December 2010 | Wett |

Foreign Patent Documents

| | | |
|---|---|---|
| EP | 0931768B1 | September 2003 |
| EP | 0826639A1 | March 1998 |
| EP | 0872451B1 | December 2002 |
| WO | 2006/129132A1 | December 2006 |
| WO | 2012/052443A1 | April 2012 |

OTHER PUBLICATIONS

Abeling and Seyfried (1992) Water Science and Technology 26(5-6): 1007-1015.
Alleman and Irvine (1980) Water Research 14: 1483-1488.
Anthonisen et al. (1976) Journal of Water Pollution Control Federation 48: 835-852.
Bernet et al. (2001) Journal of Environmental Engineering 127: 266-271.
Blackburne et al. (2008) Biodegradation 19(2): 303-312.
Ciudad et al. (2005) Process Biochemistry 40(5): 1715-1719.
Daebel et al. (2007) Water Research 41: 1094-1102.
Daigger and Littleton (2000) Water Environment Research 72: 330.
Daigger et al. (2007) Water Environment Research 79: 375
Fux et al. (2002) Journal Biotechnology 99(3): 295-306.
Gao et al. (2009) Bioresource Technology 100: 2298-2300.
Gee and Kim (2004) Water Science and Technology 49(5-6): 47-55.
Guo et al. (2009) Process Biochemistry 44: 979-985
Hanaki et al. (1990) Water Research 24: 297-302.
Hellinga et al. (1998) Water Science and Technology 37(9): 135-142.
Hippen et al. (1997) Water Science and Technology 35 (10): 111-120.
Ju et al. (2007) Water Environment Research 79(8): 912-920.
Katsogiannis et al. (2003) Water Science and Technology 47(11): 53-59.
Kim et al. (2008) Process Biochemistry 43(2): 154-160.
Kornaros and Dokianakis (2010) Environmental Science and Technology 44: 7245-7253.
Laanbroek and Gerards (1993) Archives of Microbiology 159: 453-459.
Lemaire et al. (2008) Biotechnology and Bioengineering 100 (6): 1228-1236.
Li et al. (2012) Process Safety and Environmental Protection. doi:10.1016/j.psep.2012.05.009
Ling (2009) Proceedings of 2nd IWA specialized Conference on nutrient Management in Wastewater treatment Processes pp. 403-410.
Manser et al. (2005) Water Research 39(19): 4633-4642.
Peng et al. (2004) Water Science and Technology 50(10): 35-43.
Peng et al. (2007) Chinese Journal of Chemical Engineering 15(1): 115-121.
Pollice et al. (2002) Water Research 36(10): 2541-2546.
Sedlak (1991) Phosphorus and Nitrogen Removal from Municipal Wastewater: Principles and Practice (2nd ed.).
Silverstein and Schroeder (1983) Journal of Water Pollution Control Federation 55: 377-384.
Sin et al. (2008) Water Science and Technology 58(6): 1155-1171.
Sliekers et al. (2005) Applied Microbial Biotechnology 68: 808-817.
Turk and Mavinic (1989) Water Research 23: 1383-1388.
Turk and Mavinic (1986) Canadian Journal of Civil Engineering 13: 600-605.
van Dongen et al. (2001) Water Science and Technology 44(1): 153-160.
Wett (2006) Water Science and Technology 53(12): 121-128.
Wett (2007) Water Science and Technology 56(7): 81-88.
Wett (2010) Water Science and Technology 61(8): 1915-1922.
Wong-Chong and Loehr (1978) Water Research 12(8): 605-609.
Wyffels et al. (2004) Water Science and Technology 49(5-6): 57-64.
Yang and Yang (2011) Journal of Hazardous Materials 195: 318-323.
Yoo et al. (1999) Water Research 33: 145-154.
Yu et al. (2000) Journal of Environmental Engineering 126: 943-948.
Zekker et al. (2012) Environmental Technology 33(4-6): 703-710.
Zeng et al. (2008) Chemical Engineering and Technology 31(4): 582-587.
Zeng et al. (2009) Enzyme and Microbial Technology 45(3): 22.

The invention is not limited to the structures, methods and instrumentalities described above and shown in the drawings. The invention is defined by the claims set forth below.

What is claimed and desired to be protected by Letters Patent of the United States is:

1. A wastewater treatment apparatus, comprising:
a biological nitrogen removal (BNR) reactor having a volume that is transiently aerated;
an ammonia sensor for generating an ammonia concentration signal; and a controller for processing the ammonia concentration signal and for thereby causing out-selection of nitrite oxidizing bacteria (NOB) under controlled transient anoxia conditions, the conditions being controlled either along the flow-path or along the process time-line, and wherein the apparatus is configured to cause a dissolved oxygen (DO) profile to switch between a lower DO setpoint of less than 0.1 mg/L and an upper DO setpoint of greater than 1.0 mg/L, and wherein an aeration system activation interval, the upper DO setpoint, or both are set such that an on-line measured ammonia concentration is higher than 1.5 mg/L ammonia as nitrogen, for more than 75% of the transiently-aerated reactor volume in space or time.

2. The apparatus of claim 1, further comprising an oxidized nitrogen sensor for sensing oxidized nitrogen in the reactor, and for generating concentration signals that can be nitrite, nitrate or combination of nitrite and nitrate and wherein the controller processes the ammonia and oxidized nitrogen concentration signals, and controls DO concentration, duration of an aerobic period, and/or duration of an anoxic period, in the reactor, based on the ammonia concentration and an oxidized nitrogen concentration.

3. The apparatus of claim 2, wherein the controller generates instructions for increasing, decreasing or maintaining the DO concentration, the duration of the aerobic period, and/or the duration of the anoxic period, to maintain (A) a ratio of the ammonia concentration to the oxidized nitrogen concentration, on an as nitrogen basis, from about 0.5 to 1.5 or (B) a sum of the ammonia concentration plus the negative value of the oxidized nitrogen concentration, on an as nitrogen basis, from −3.0 to +1.0.

4. The apparatus of claim 1, wherein the reactor has a limited aerobic sludge retention time for reaching an ammonia setpoint by controlled extension of anoxic periods or volume and by controlling the sludge wasting rate, to maintain DO greater than 1 mg/L in the case of DO intensity control, or to increase aerobic duration by decreasing anoxic duration in the case of aerobic/anoxic duration control.

5. The apparatus of claim 1, wherein the BNR reactor receives bioaugmentation of ammonia oxidizing bacteria (AOB) from a high-ammonia-strength reactor, having a reactor feed concentration greater than 200 mg/L ammonia as nitrogen, and wherein a less dense, more compressible, or unattached sludge fraction is selected from the high-ammonia-strength reactor for the bioaugmentation, and fed to the BNR reactor such that retention time of the bioaugmentation fraction is less than 10 days in the high-ammonia-strength reactor.

6. The apparatus of claim 2, wherein the controller generates instructions for increasing, decreasing or maintaining the DO concentration, the duration of the aerobic period, and/or the duration of the anoxic period in the reactor based on a ratio or sum of the ammonia concentration and oxidized nitrogen concentration.

7. The apparatus of claim 1, further comprising a high-ammonia-strength reactor for bioaugmentation of anammox organisms to provide microbial competitors for nitrite for out-selection of NOB.

8. The apparatus of claim 1, wherein the apparatus is configured to maintain an oxygen uptake rate allowing for rapid transition to anoxia of less than 10 minutes from an aerated state, and wherein the apparatus includes aeration devices for causing rapid transition from anoxia to an aerated condition.

9. A wastewater treatment apparatus comprising:
a reactor having a volume that is transiently aerated;
a first sensor for sensing ammonia concentration in the reactor, and for generating an ammonia signal representative of ammonia concentration;
a second sensor for sensing oxidized nitrogen concentration in the reactor, and for generating an oxidized nitrogen signal representative of nitrite, nitrate, or combination of nitrite and nitrate concentration; and
a controller for processing the oxidized nitrogen and an ammonia concentration signals, and for controlling dissolved oxygen (DO) concentration, duration of an aerobic period, and/or duration of an anoxic period, in the reactor, based on a ratio or sum of ammonia concentration and oxidized nitrogen concentration, and
wherein an aeration system activation interval is set such that an on-line measured ammonia concentration is higher than 1.5 mg/L ammonia as nitrogen, for more than 75% of the transiently-aerated reactor volume in space or time, and
wherein a controlled effluent containing ammonia and nitrite is fed into an anoxic reactor where anammox bacteria are selectively grown and retained.

10. The apparatus described in claim 9, further comprising a supply of an organic or inorganic substrate or combination of substrates;
an effluent stream containing a blend of ammonia, nitrite, and nitrate; and
a second reactor, wherein the supply of the organic or inorganic substrate or combination of substrates is added to the effluent stream that is supplied to second reactor such that further nitrogen removal can be accomplished using anammox accomplishing selective reduction of nitrate to nitrite by anammox or other microorganisms and subsequent nitrite and ammonia removal by anammox.

11. A wastewater treatment method, comprising:
providing a biological nitrogen removal (BNR) reactor that is transiently aerated;
using an ammonia sensor to generate an ammonia concentration signal;
using a controller to process the ammonia concentration signal and thereby cause out-selection of nitrite oxidizing bacteria (NOB) under controlled transient anoxia conditions, the conditions being controlled either along the flow-path or along the process time-line,
causing a dissolved oxygen (DO) profile to switch between a lower DO setpoint of less than 0.1 mg/L and an upper DO setpoint of greater than 1.0 mg/L; and
setting an aeration system activation interval, the upper DO setpoint, or both such that an on-line measured ammonia concentration is higher than 1.5 mg/L ammonia as nitrogen, for more than 75% of the transiently-aerated reactor volume in space or time.

12. The method of claim 11, further comprising decreasing an NOB net observed growth rate by exposure to an inhibitor, a nitrogenous metabolic intermediate, or a toxic substance.

13. The method of claim 11, further comprising using a growth factor to increase ammonia oxidizing bacteria (AOB) and anammox net growth rates.

14. The method of claim 11, further comprising using an oxidized nitrogen sensor to sense oxidized nitrogen concentration in the reactor, and to generate an oxidized nitrogen signal, that can be nitrite, nitrate or combination of nitrite and nitrate, and wherein the controller processes the ammonia and oxidized nitrogen concentration signals, and controls DO concentration, duration of an aerobic period, and/or duration of an anoxic period, in the reactor, based on ammonia concentration and oxidized nitrogen concentration.

15. The method of claim 11, further comprising causing the controller to generate instructions for increasing, decreasing or maintaining the DO concentration, the duration of the aerobic period, and/or the duration of the anoxic period, to maintain (A) a ratio of the ammonia concentration to the oxidized nitrogen concentration, on an as nitrogen basis, from about 0.5 to 1.5 or (B) a sum of the ammonia concentration plus the negative value of the oxidized nitrogen concentration, on an as nitrogen basis, from −3.0 to +1.0.

16. The method of claim 11, further comprising limiting an aerobic sludge retention time for the reactor to reach an ammonia setpoint by controlled extension of anoxic periods or volume and by controlling the sludge wasting rate, to maintain DO greater than 1 mg/L in the case of DO intensity control, or to increase aerobic duration by decreasing anoxic duration in the case of aerobic/anoxic duration control.

17. The method of claim 11, further comprising the step of feeding ammonia oxidizing bacteria (AOB) to the BNR reactor from a high-ammonia-strength reactor, having a reactor feed concentration greater than 200 mg/L ammonia as nitrogen, and wherein a less dense, more compressible, or unattached sludge fraction is selected from the high-ammonia-strength reactor, and is fed to the BNR reactor such that retention time of the fraction is less than 10 days in the high-ammonia-strength reactor.

18. The method of claim 11, further comprising the step of providing a high-ammonia-strength reactor for bioaugmentation of anammox organisms, and using the high-ammonia-strength reactor to provide microbial competitors for nitrite for out-selection of NOB.

19. The method of claim 11, further comprising the step of causing the controller to generate instructions for increasing, decreasing or maintaining the DO concentration, the duration of the aerobic period, and/or the duration of the anoxic period, in the reactor, based on a ratio or sum of ammonia concentration and oxidized nitrogen concentration, wherein a controlled effluent containing ammonia and nitrite is fed into an anoxic reactor where anammox bacteria are selectively grown and retained.

20. The method described in claim 19, wherein an effluent stream contains a blend of ammonia, nitrite, and nitrate, such that further nitrogen removal can be accomplished using anammox in which an organic or inorganic substrate or combination of substrates are added to accomplish selective reduction of nitrate to nitrite by anammox or other microorganisms and subsequent nitrite and ammonia removal by anammox.

* * * * *